United States Patent
Dalton et al.

(10) Patent No.: US 7,149,604 B2
(45) Date of Patent: Dec. 12, 2006

(54) METHOD AND SYSTEM FOR BACKING UP PROGRAMMABLE LOGIC CONTROLLERS OVER NETWORK

(75) Inventors: Rick Dalton, Bremen, GA (US); Scott Hamilton, Anniston, AL (US); Al Oravet, Southside, AL (US); Atsushi Ueyama, Birmingham, AL (US); John Deno, Anniston, AL (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 851 days.

(21) Appl. No.: 10/303,193

(22) Filed: Nov. 25, 2002

(65) Prior Publication Data

US 2004/0103168 A1    May 27, 2004

(51) Int. Cl.
 *G05B 19/04* (2006.01)
 *G05B 19/418* (2006.01)
 *G05B 19/18* (2006.01)
 *G05B 11/01* (2006.01)

(52) U.S. Cl. ............... 700/247; 700/2; 700/3; 700/19; 700/249; 709/217; 709/220; 709/221; 709/244

(58) Field of Classification Search ............... 700/17, 700/18, 83, 86, 87, 88, 19, 20, 180, 181, 700/247, 249, 215; 709/217, 220, 221, 244, 709/238
See application file for complete search history.

(56) References Cited

U.S. PATENT DOCUMENTS

| | | | |
|---|---|---|---|
| 4,901,218 A | | 2/1990 | Cornwell |
| 5,038,318 A | * | 8/1991 | Roseman ................ 712/30 |
| 5,576,946 A | * | 11/1996 | Bender et al. ........... 700/17 |
| 5,975,737 A | | 11/1999 | Crater et al. |
| 6,175,206 B1 | | 1/2001 | Ueno et al. |
| 6,282,454 B1 | | 8/2001 | Papadopoulos et al. |
| 6,445,969 B1 | * | 9/2002 | Kenney et al. .......... 700/108 |
| 6,999,824 B1 | * | 2/2006 | Glanzer et al. .......... 700/18 |
| 2002/0002414 A1 | * | 1/2002 | Hslung et al. .......... 700/95 |
| 2002/0156542 A1 | * | 10/2002 | Nandi ................... 700/30 |
| 2004/0194101 A1 | * | 9/2004 | Glanzer et al. .......... 718/100 |
| 2004/0267535 A1 | * | 12/2004 | Kotzin ................... 704/275 |
| 2005/0085017 A1 | * | 4/2005 | Ito et al. ................. 438/115 |

* cited by examiner

*Primary Examiner*—Ramesh Patel
(74) *Attorney, Agent, or Firm*—Rankin, Hill, Porter & Clark LLP; Vincent Ciamacco

(57) ABSTRACT

A manufacturing facility includes a plurality of programmable logic controllers that contain operating programs and process parameters. The programmable logic controllers are connected to a network such that the operating programs and process parameters from the programmable logic controllers can be backed-up to a remote data storage device. Preferably, the backing-up of the programmable logic controllers takes place automatically and periodically in a manner that does not interrupt the manufacturing process.

6 Claims, 1 Drawing Sheet

METHOD AND SYSTEM FOR BACKING UP PROGRAMMABLE LOGIC CONTROLLERS OVER NETWORK

BACKGROUND OF THE INVENTION

1. Field of the Invention

The present invention relates generally to data control in manufacturing environments and, more particularly, to systems and methods for backing up control programs in manufacturing environments.

2. Description of Related Art

As manufacturing methods have become more advanced and automated, the number of dedicated local operating programs for programmable logic controllers and robotic systems have increased dramatically. In modern factories, the number of PLCs and robotic systems that have locally resident programs may number in the hundreds.

Conventionally, in order to preserve data integrity in the case of technical problems or mechanical failure, it is necessary to back-up each of the local programs so that the programs can be restored, when necessary. As the programs or operating procedures may be changed or modified periodically, maintaining a current version of the program or operating procedures is logistically difficult. Moreover, it is rather difficult to ensure that any of the backed-up programs is the latest version of the operating procedure or program when such backed-up program must be reinstalled or restored. Therefore, there is significant risk that the restored program will be an out-of-date version of the operating program, and may cause problems.

Therefore, there exists a need in the art for a method and system to facilitate backing-up of PLCs and robotic systems in a manufacturing environment. There further exists a need in the art for a method of systematically backing up and restoring programs and operating procedures in manufacturing environments.

SUMMARY OF THE INVENTION

The present invention is directed toward a system and method for backing-up PLCs and robotic systems in a manufacturing environment wherein a plant-wide network is utilized to access, back-up, and selectively restore locally resident programs and operating procedures.

In accordance with the present invention, a method for storing manufacturing process parameters includes the steps of providing a plurality of programmable logic controllers, connecting each of said plurality of programmable logic controllers to a network, and using said network to back-up the programs and operating parameters from the programmable logic controllers to a remote data storage device.

BRIEF DESCRIPTION OF THE DRAWING

These and further features of the invention will be apparent with reference to the following description and drawing, wherein a portion of a plant-wide network and its relationship to programmable logic controllers and robotic systems is schematically illustrated.

DETAILED DESCRIPTION OF THE PREFERRED EMBODIMENT

Figure 1:
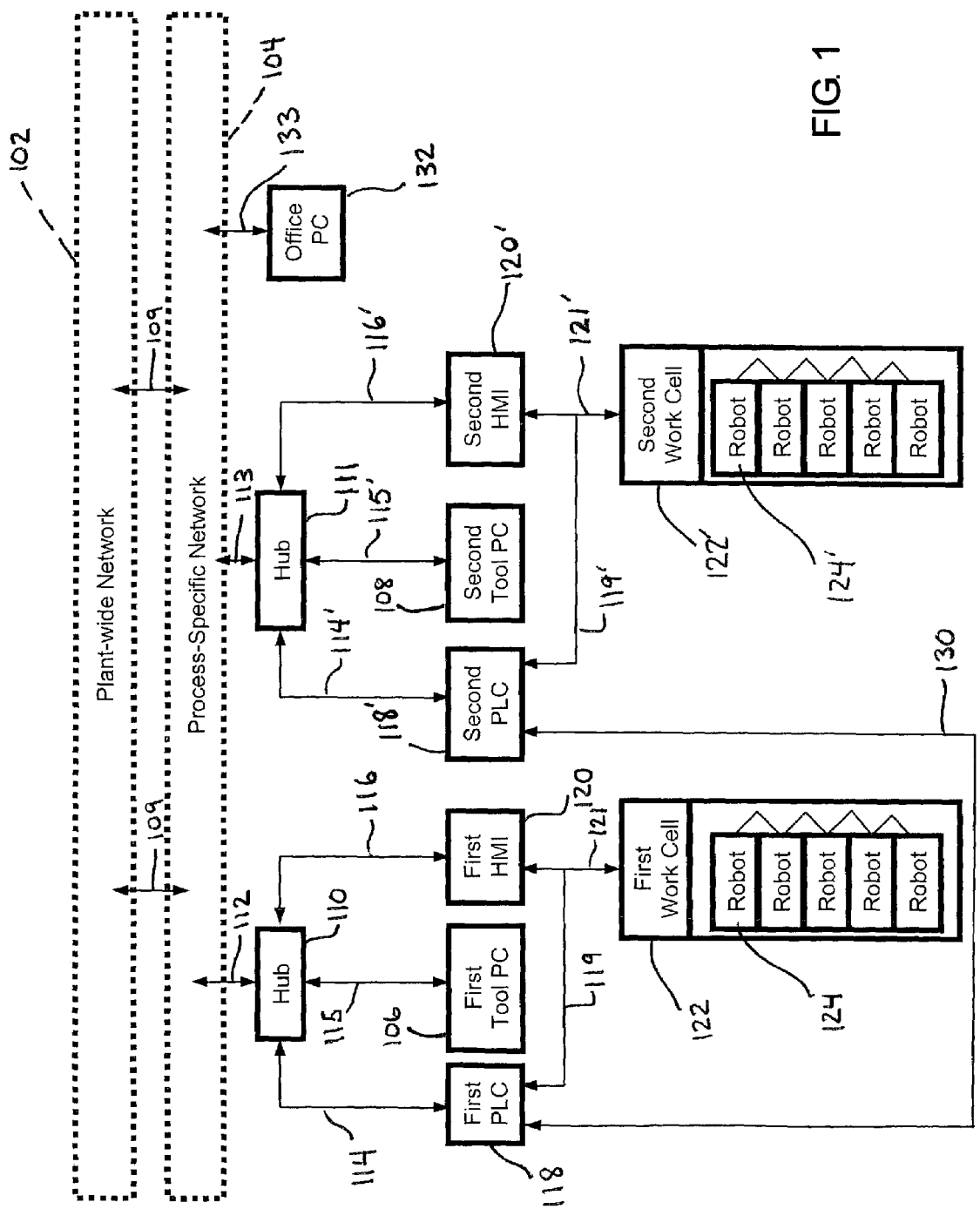

With reference to the drawing, a portion of a manufacturing environment incorporating the present invention is schematically illustrated. As illustrated, an overall or plant-wide network 102, local process-specific network 104, and first and second local tool computers 106, 108 are provided. The process-specific network 104 will generally relate to a specific portion of the manufacturing process, such as painting or welding.

The local process-specific network 104 is connected to the overall or plant-wide network 102 by means of conventional network connections 109. The first and second local tool computers 106, 108 are connected to the process-specific network 104 by a hub 110, 111 and conventional network or Ethernet connections 112, 113, which are preferably hard-wired, but may also be wireless, if desired.

The first local tool computer 106 is connected via the hub 110 and Ethernet connections 114, 115, 116 to a first PLC 118 and a first human-machine interface (HMI) 120, which are adapted to control a first work cell 122 consisting of a plurality of robots 124. Two-way communication is provided between the first tool computer 106 and the first PLC 118 and the first HMI 120 via the hub 110. Similarly, two-way communication is provided between the first PLC 118 and the first work cell 122 via connection 119, as well as between the first HMI 120 and the first work cell 122 via connection 121. While five welding robots 124 comprise the first work cell 122 in the illustrated embodiment, it is considered apparent that relatively more or less than five welding robots 124 may be provided without departing from the present invention.

The first HMI 120 includes display means and input means to permit a user to view and selectively change the operating parameters of the first PLC 118 and to monitor the process as it is performed by the various robots 124 of the first work cell 122. Similarly, the first PLC 118 monitors and controls the process performed by the various robots 124 in the first work cell 122. The first PLC 118 also communicates with the second PLC 118' via a controller link 130 by means of which the various PLCs on the local process-specific network 104 may be linked, as will be described more fully hereinafter. Communication between the first PLC 118 and the process-specific network 104 is regulated or controlled by a firewall resident in the first PLC 118 that, therefore, functionally isolates the first PLC 118 from the network. Therefore, only authorized personnel have access to the first PLC 118.

The second local tool computer 108 and associated second PLC 118', second HMI 120', and second work cell 122' are substantially identical to that described hereinbefore with regard to the first local tool computer 106. More specifically, the second local tool computer 108 is connected via the hub 111 and Ethernet connections 114', 115', 116' to the second PLC 118' and the second HMI 120' that are adapted to control the second work cell 122', which consists of a plurality of robots 124'. Two-way communication is provided between the second tool computer 108 and the second PLC 118' and the second HMI 120' via the hub 111. Two-way communication is also provided between the second PLC 118' and the second work cell 122' via connection 119', as well as between the second HMI 120' and the second work cell 122' via connection 121'.

The second HMI 120' includes display means and input means to permit the user to view and selectively change the operating parameters of the second PLC 118' and to monitor the process as it is performed by the various robots 124' of the work cell 122'. The second PLC 118' monitors and controls the process performed by the various robots 124' in the work cell 122'. Communication between the second PLC 118' and the process-specific network 104 is regulated or controlled by a firewall resident in the second PLC 118' that, therefore, functionally isolates the second PLC 118' from the network. Therefore, only authorized personnel have access to the second PLC 118'.

As will be appreciated by those skilled in the art, although only first and second local tool computers 106, 108 are shown, it is considered apparent that, in actual practice, significantly more than two local tool computers would be expected. Similarly, the number of PLCs and robotic systems are only for illustrative purposes, and would normally be significantly greater. An office computer 132 is shown connected to the process specific network 104 via a network connection 133. The office computer 132 is representative of plural computers that may be connected to the process-specific network and adapted to communicate with the tool computers 106, 108 and PLCs 118, 118', as will be discussed more fully hereinafter.

The first and second tool computers 106, 108 facilitate and enable communication, via the hub 110, 111, between the process-specific network 104 and the associated PLC 118, 118' and HMI 120, 120'. In the prior art, the operating programs and/or selected operating parameters for the work cells would have been stored only in the PLCs 118, 118'. Therefore, in the prior art it is necessary to periodically back-up the PLCs, including the programs and operating parameters, in order to insure continued operability of the control programs in the event of component failure. Unfortunately, due to the large number of PLCs in a modern automated manufacturing process, backing up the PLC data takes an inordinately large amount of time, and requires a high degree of diligence to ensure that the current operating programs and parameters are consistently available on back-up.

However, with the present invention, the data, programs, and operating parameters for each of the PLCs can be backed-up using the associated tool computers 106, 108, the process-specific network 104, and the plant-wide network 102. Preferably, the PLCs 118, 118' are backed-up on the tool computers 106, 108 periodically. More preferably, the PLCs 118, 118' are periodically backed-up to a data storage device accessible over the process-specific network 104 (i.e., office computer 132), making it possible to automatically back-up all of the PLCs in the process-specific network at regular intervals. Most preferably, the PLCs are periodically backed-up to a storage device accessible over the plant-wide network 102 (i.e., a remote storage device such as a network server, not shown), making it possible to back-up all of the PLCs covered by the plant-wide network 102 at regular intervals. While the back-ups may be performed manually, preferably the back-ups will be performed automatically at convenient times in the manufacturing process, such as between shifts or at other times when manufacturing is not occurring.

By having current back-ups of PLC operating programs and parameters, it is possible to restore the current manufacturing data should any particular PLC fail. Moreover, by backing-up PLC data and operating parameters on a plant-wide basis, it is now possible to transfer entire operating processes between factories. For example, it is now common for several factories for a given company to have almost identical manufacturing assembly lines. These lines differ primarily in that a different model of a given product (i.e. vehicle) is made at each factory. If a particular factory that is manufacturing a particular vehicle experiences some catastrophic event, such as an earthquake, gross power failure, war, labor strike, then the operating parameters for the vehicle being manufactured at that particular factory can be transferred to a second, geographically or politically remote factory and production of the particular vehicle can resume in short order.

It is further possible with the present invention to remotely store manufacturing or process data for a plurality of factories at a remote, secure facility. The data could be retained for security purposes, and could be used as an evaluation tool to determine the cause of differences between factories, especially production differences (efficiency, quality, etc.) between factories producing the same product.

What is claimed is:

1. A method for storing manufacturing process parameters, comprising the steps of:
   providing a plurality of programmable logic controllers that are operable to control a manufacturing process, said programmable logic controllers having programs and operating parameters stored therein, wherein said programs contain instructions for controlling the manufacturing process;
   connecting each of said plurality of programmable logic controllers to a network; and,
   using said network to back-up the programs and operating parameters from the programmable logic controllers to a remote data storage device.

2. The method according to claim 1, wherein said network is a process specific network and is associated with a plurality of computers, at least some of said computers being connected, via data connections, to said programmable logic controllers, and wherein said remote data storage device accesses said programmable logic controllers over said process specific network.

3. The method according to claim 2, further comprising a plant-wide network that, in a network hierarchy, is over said process specific network, and wherein access to said programmable logic controllers from either of said process specific network and said plant-wide network is restricted, and wherein said remote data storage device accesses said programmable logic controllers over said plant-wide network and said process specific network.

4. The method according to claim 1, wherein said remote data storage device is adapted to automatically and periodically back-up said plurality of programmable logic controllers.

5. The method according to claim 4, wherein said network is a process specific network and is associated with a plurality of computers, at least some of said computers being connected, via data connections, to said programmable logic controllers, and wherein said remote data storage device accesses said programmable logic controllers over said process specific network.

6. The method according to claim 5, further comprising a plant-wide network that, in a network hierarchy, is over said process specific network, and wherein access to said process specific network from said plant-wide network is restricted, and wherein said remote data storage device accesses said programmable logic controllers over said plant-wide network and said process specific network.

* * * * *